US008680005B2

(12) United States Patent
Hannemann et al.

(10) Patent No.: US 8,680,005 B2
(45) Date of Patent: Mar. 25, 2014

(54) CATALYST FROM FLAME-SPRAY PYROLYSIS AND CATALYST FOR AUTOTHERMAL PROPANE DEHYDROGENATION

(75) Inventors: Stefan Hannemann, Mannheim (DE); Dieter Stützer, Dudenhofen (DE); Goetz-Peter Schindler, Ludwigshafen (DE); Peter Pfab, Shaker Heights, OH (US); Frank Kleine Jäger, Bad Dürkheim (DE); Dirk Großschmidt, Mannheim (DE)

(73) Assignee: BASF SE, Ludwigshafen (DE)

( * ) Notice: Subject to any disclaimer, the term of this patent is extended or adjusted under 35 U.S.C. 154(b) by 96 days.

(21) Appl. No.: 13/356,787

(22) Filed: Jan. 24, 2012

(65) Prior Publication Data
US 2012/0190538 A1    Jul. 26, 2012

Related U.S. Application Data

(60) Provisional application No. 61/435,797, filed on Jan. 25, 2011.

(51) Int. Cl.
*B01J 23/42* (2006.01)
*B01J 23/44* (2006.01)
*B01J 21/00* (2006.01)
*B01J 23/00* (2006.01)
*B01J 23/58* (2006.01)
*B01J 23/02* (2006.01)
*B01J 23/04* (2006.01)

(52) U.S. Cl.
USPC ........... 502/339; 502/240; 502/242; 502/243; 502/262; 502/303; 502/330; 502/344; 502/349

(58) Field of Classification Search
USPC ......... 502/240, 242, 243, 262, 303, 330, 339, 502/344, 349
See application file for complete search history.

(56) References Cited

U.S. PATENT DOCUMENTS 5,935,897 A * 8/1999 Trubenbach et al. ......... 502/172
(Continued)

FOREIGN PATENT DOCUMENTS

CN        101164690        4/2008
(Continued)

OTHER PUBLICATIONS

Pisduangdaw et al., "Characteristics and catalytic properties of Pt—Sn/Al2O3 nanoparticles synthesized by one-step flame spray pyrolysis in the dehydrogenation of propane," Applied Catalysis A: General 370 (2009) 1-6.*

(Continued)

*Primary Examiner* — Anthony J Zimmer
(74) *Attorney, Agent, or Firm* — Novak Druce Connolly Bove + Quigg LLP

(57) ABSTRACT

The invention relates to a method of production of catalyst particles, comprising platinum and tin and also at least one further element, selected from lanthanum and cesium, on zirconium dioxide as support, comprising the steps: preparation of one or more solutions containing precursor compounds of Pt, Sn and at least one further element of La or Cs and also $ZrO_2$, converting the solution(s) to an aerosol, bringing the aerosol into a directly or indirectly heated pyrolysis zone, carrying out pyrolysis, and separation of the particles formed from the pyrolysis gas.

Suitable precursor compounds comprise zirconium(IV) acetylacetonate, lanthanum(II) acetylacetonate and cesium acetate, hexamethyldisiloxane, tin 2-ethylhexanoate, platinum acetylacetonate, zirconium(IV) propylate in n-propanol and lanthanum(II) acetylacetonate.

The invention also relates to the catalyst particles obtainable using the method according to the invention, and to the use thereof as dehydrogenation catalysts.

14 Claims, 1 Drawing Sheet

(56) References Cited

U.S. PATENT DOCUMENTS

| | | | |
|---|---|---|---|
| 5,935,898 A * | 8/1999 | Trubenbach et al. | 502/300 |
| 6,034,029 A | 3/2000 | Wulff-Doring et al. | |
| 6,576,804 B1 | 6/2003 | Heineke et al. | |
| 6,670,303 B1 | 12/2003 | Heineke et al. | |
| 6,740,620 B2 * | 5/2004 | Bogan et al. | 502/300 |
| 7,285,685 B2 * | 10/2007 | Walsdorff et al. | 568/343 |
| 2007/0032681 A1 | 2/2007 | Walsdorff et al. | |
| 2012/0093703 A1 * | 4/2012 | Lewis et al. | 423/213.2 |
| 2012/0198769 A1 * | 8/2012 | Schirrmeister et al. | 48/128 |

FOREIGN PATENT DOCUMENTS

| | | |
|---|---|---|
| CN | 101164690 A * | 4/2008 |
| CN | 101773850 | 7/2010 |
| DE | 195 00 366 C1 | 5/1996 |
| DE | 196 54 391 A1 | 7/1998 |
| EP | 0 849 224 A1 | 6/1998 |
| EP | 1074301 A1 | 2/2001 |
| WO | WO2005009937 | 2/2005 |
| WO | WO2010133565 | 11/2010 |

OTHER PUBLICATIONS

U.S. Appl. No. 13/356,766, filed Jan. 24, 2012, Stefan Hannemann, et al.

Sukanya Pisduangdaw, et al., Characteristics and catalytic properties of Pt-Sn/$Al_2O_3$..., Applied Catalysis A: General, Aug. 13, 2009, 370 (2009) p. 1-6.

International Search Report for PCT/IB2012/050302, mailing date Jun. 14, 2012.

International Preliminary Report on Patentability for PCT/IB2012/050302, mailing date Jun. 6, 2013.

* cited by examiner

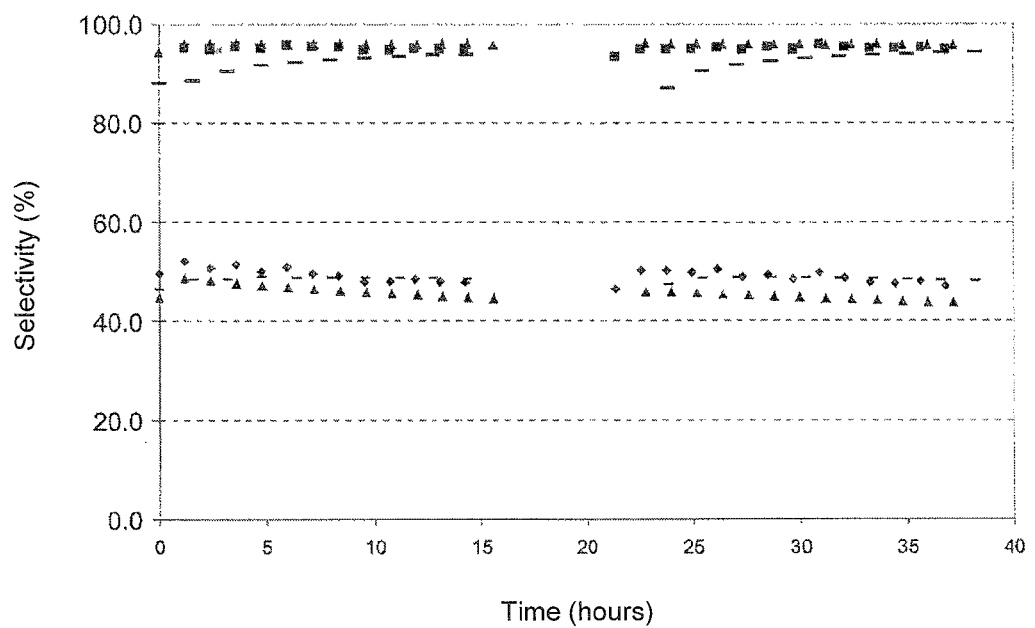

CATALYST FROM FLAME-SPRAY PYROLYSIS AND CATALYST FOR AUTOTHERMAL PROPANE DEHYDROGENATION

CROSS-REFERENCE TO RELATED APPLICATIONS

This application claims benefit (under 35 USC 119(e)) of U.S. Provisional Application 61/435,797, filed Jan. 25, 2011, which is incorporated by reference.

BACKGROUND OF THE INVENTION

The invention relates to catalyst particles, a method of production thereof and the use of the catalyst particles as dehydrogenation catalyst.

Production of dehydrogenation catalysts by impregnation processes or spray drying is known. In these methods the catalytically active metals are applied on an oxide support or a silicate support by impregnation processes or the catalyst is produced by spray drying of coprecipitated oxide precursors.

DE-A 196 54 391 describes the production of a dehydrogenation catalyst by impregnation of essentially monoclinic $ZrO_2$ with a solution of $Pt(NO_3)_2$ and $Sn(OAc)_2$ or by impregnation of $ZrO_2$ with a first solution of $Pt(NO_3)_2$ and then a second solution of $La(NO_3)_3$. The impregnated supports are dried and then calcined. The catalysts thus obtained are used as dehydrogenation catalysts for the dehydrogenation of propane to propene.

A known method of production of metal catalysts by flame-spray pyrolysis is described in Pisduangnawakij et al., Applied Catalysis A: General 370 1-6, 2009. In this, a solution containing precursor compounds of platinum and tin and of aluminum oxide as support in xylene is converted to an aerosol, this is treated in an inert carrier gas in a pyrolysis reactor at a temperature above the decomposition temperature of the precursor compounds and then the finely-divided metal that has formed is separated from the carrier gas.

The known synthesis of precious metal powder catalysts by wet-chemical preparation is time-consuming and costly.

The methods for the production of dehydrogenation catalysts are therefore still in need of improvement in terms of the time and costs they involve.

A SUMMARY OF THE INVENTION

The problem to be solved by the present invention is to provide an inexpensive and time-saving method of production of dehydrogenation catalysts, wherein the dehydrogenation catalysts obtained should be comparable in activity and selectivity to the catalysts of the prior art, produced by impregnation processes or spray drying.

This problem is solved by a method of production of catalyst particles, comprising platinum and tin and also at least one further element, selected from lanthanum and cesium, on a support comprising zirconium dioxide, comprising the steps
(i) preparation of one or more solutions containing precursor compounds of platinum, tin and the at least one further element, selected from lanthanum and cesium, and also of zirconium dioxide,
(ii) converting the solution(s) to an aerosol,
(iii) bringing the aerosol into a directly or indirectly heated pyrolysis zone,
(iv) carrying out pyrolysis, and
(v) separation of the particles formed from the pyrolysis gas.

A BRIEF DESCRIPTION OF THE FIGURE

FIG. 1 illustrates activities and selectivities for the flame-synthesized catalysts (▲ example 13, ■ example 17) and for the reference catalyst (-) in the autothermal dehydrogenation of propane to propene.

A DETAILED DESCRIPTION OF THE INVENTION

The metal compounds and oxide-forming precursor compounds are fed as aerosol to the pyrolysis zone. It is preferable if the aerosol fed to the pyrolysis zone is obtained by nebulization of just one solution, which contains all the metal compounds and oxide-forming precursor compounds. In this way it is always ensured that the composition of the particles produced is homogeneous and constant. During preparation of the solution that is to be converted to an aerosol, the individual components are thus preferably selected so that the oxide-forming precursors and the precious metal compounds used contained in the solution are dissolved uniformly alongside one another until nebulization of the solution. Alternatively it is also possible to use several different solutions, which, on the one hand, contain the oxide-forming precursors and, on the other hand, contain the active or promoter metal compounds. The solution or solutions can contain both polar and apolar solvents or solvent mixtures.

In the pyrolysis zone, decomposition of the precious metal compound to form the precious metal and decomposition and/or oxidation of the oxide precursors, with formation of the oxide, take place. It may also happen that some of the precious metal evaporates and then redeposits in cooler zones on support particles already formed. Pyrolysis generally results in spherical particles with varying specific surface.

The temperature in the pyrolysis zone is above the decomposition temperature of the precious metal compounds at sufficient temperature for oxide formation, usually between 500 and 2000° C. Pyrolysis is preferably carried out at a temperature from 900 to 1500° C.

The pyrolysis reactor can be heated indirectly from outside, for example by means of an electric furnace. Owing to the temperature gradient from outside to inside that is required in indirect heating, the furnace must be much hotter than corresponds to the temperature required for pyrolysis. Indirect heating requires a thermally stable furnace material and an expensive reactor construction, but the total amount of gas required is less than in the case of a flame reactor.

In a preferred embodiment the pyrolysis zone is heated by a flame (flame-spray pyrolysis). The pyrolysis zone then comprises an ignition device. For direct heating, usual combustible gases are used, although preferably hydrogen, methane or ethylene is used. The temperature in the pyrolysis zone can be adjusted as required by means of the ratio of the amount of combustible gas to the total amount of gas. To keep the total amount of gas low but nevertheless achieve a temperature as high as possible, the pyrolysis zone can also be supplied with pure oxygen instead of air as the $O_2$ source for combustion of the combustible gases. The total amount of gas also comprises the carrier gas for the aerosol and the evaporated solvent of the aerosol. The aerosol or aerosols supplied to the pyrolysis zone are preferably fed directly into the flame. Although air is generally preferred as carrier gas for the aerosol, it is also possible to use nitrogen, $CO_2$, $O_2$ or a combustible gas, for example hydrogen, methane, ethylene, propane or butane.

In another embodiment of the method according to the invention, the pyrolysis zone is heated by an electric plasma or an inductive plasma. In this embodiment, the catalytically active precious metal particles are deposited on the surface of the support particles and are fixed firmly thereon.

A flame-spray pyrolysis device generally comprises a storage container for the liquid to be nebulized, feed pipes for carrier gas, combustible gas and oxygen-containing gas, a central aerosol nozzle, and an annular burner arranged around this, a device for gas-solid separation comprising a filter element and a discharging device for the solid and an outlet for the exhaust gas. The particles are cooled by means of a quench gas, e.g. nitrogen or air.

The pyrolysis zone preferably comprises a so-called pre-drier, which subjects the aerosol to preliminary drying before its entry into the pyrolysis reactor, this preliminary drying taking place, for example, in a flow tube with a heating assembly disposed around it. Where preliminary drying is not carried out, the risk exists of obtaining a product with a relatively broad particle size spectrum, and more particularly an excessive fine fraction. The temperature of the pre-drier is dependent on the nature of the dissolved precursors and on the concentration thereof. The temperature in the pre-drier is typically above the boiling point of the solvent, up to 250° C.; in the case of water as a solvent, the temperature in the pre-drier is preferably between 120 and 250° C., more particularly between 150 and 200° C. The pre-dried aerosol, supplied to the pyrolysis reactor via a line, then enters the reactor via an exit nozzle.

To produce a balanced temperature profile, the combustion space, which is preferably tube-shaped, is heat-insulated.

As the pyrolysis result, a pyrolysis gas is obtained, which contains spherical particles with varying specific surface. The size distribution of the pigment particles obtained results essentially directly from the droplet spectrum of the aerosol fed into the pyrolysis zone and the concentration of the solution or solutions used.

Preferably, prior to separation of the particles formed from the pyrolysis gas, the pyrolysis gas is cooled so that sintering together of the particles is excluded. For this reason the pyrolysis zone preferably comprises a cooling zone, which adjoins the combustion space of the pyrolysis reactor. Cooling of the pyrolysis gas and of the catalyst particles contained therein to a temperature of about 100-500° C. is generally required, depending on the filter element used. Cooling to approx. 100-150° C. preferably takes place. After leaving the pyrolysis zone, the pyrolysis gas, containing catalyst particles, and partially cooled, enters a device for separating the particles from the pyrolysis gas, which comprises a filter element. For cooling, a quench gas, for example nitrogen, air or water-moistened air, is fed in.

Suitable zirconium dioxide-forming precursor compounds are alcoholates, such as zirconium(IV) ethanolate, zirconium (IV) n-propanolate, zirconium(IV) isopropanolate, zirconium(IV) n-butanolate and zirconium(IV) tert-butanolate. In a preferred embodiment of the method according to the invention, zirconium(IV) propanolate, preferably as solution in n-propanol, is used as $ZrO_2$ precursor compound.

Other suitable zirconium dioxide-forming precursor compounds are carboxylates, such as zirconium acetate, zirconium propionate, zirconium oxalate, zirconium octoate, zirconium 2-ethyl-hexanoate, zirconium acetate, zirconium propionate, zirconium oxalate, zirconium octanoate, zirconium 2-ethylhexanoate, zirconium neodecanoate zirconium stearate and zirconium propionate. In another preferred embodiment of the method according to the invention, zirconium(IV) acetylacetonate is used as precursor compound.

In one embodiment, the precursor compounds additionally comprise a silicon dioxide precursor compound. Possible precursors for silicon dioxide are organosilanes and reaction products of $SiCl_4$ with lower alcohols or lower carboxylic acids. It is also possible to use condensates of the aforementioned organosilanes and/or -silanols with Si—O—Si units. Siloxanes are preferably used. It is also possible to use $SiO_2$. In a preferred embodiment of the method according to the invention, the precursor compounds comprise hexamethyldisiloxane as silica-forming precursor compound.

Besides zirconium dioxide and optionally silicon dioxide as supports, the catalyst particles according to the invention further comprise platinum and tin and also at least one further element, selected from lanthanum and cesium.

In one preferred embodiment of the invention, the Pt loading is 0.05 to 1 wt. % and the Sn loading is 0.05 to 2 wt. %.

Preferred precursor compounds for lanthanum and cesium, respectively, are carboxylates and nitrates, corresponding for example to the carboxylates identified above in connection with zirconium. In one preferred embodiment of the method according to the invention, the precursor compounds comprise lanthanum(III) acetylacetonate and/or cesium acetate.

In a further, preferred embodiment of the method according to the invention, the precursor compounds comprise lanthanum(III) 2-ethylhexanoate.

Preferred precursor compounds for tin are carboxylates and nitrates, corresponding for example to the carboxylates identified above in connection with zirconium. In a further, preferred embodiment of the method according to the invention, the precursor compounds comprise tin 2-ethylhexanoate.

Preferred precursor compounds for platinum are carboxylates and nitrates, corresponding for example to the carboxylates identified above in connection with zirconium, and ammonium platinates. In a preferred embodiment of the method according to the invention, the precursor compounds comprise platinum acetylacetonate.

Both polar and apolar solvents or solvent mixtures can be used for production of the solution or solutions required for aerosol formation.

Preferred polar solvents are water, methanol, ethanol, n-propanol, iso-propanol, n-butanol, tert-butanol, n-propanone, n-butanone, diethyl ether, tert-butyl-methyl ether, tetrahydrofuran, $C_1$-$C_8$ carboxylic acids, ethyl acetate and mixtures thereof.

In a preferred embodiment of the method according to the invention, one or more of the precursor compounds, preferably all the precursor compounds are dissolved in a mixture of acetic acid, ethanol and water. Preferably this mixture contains 30 to 75 wt. % acetic acid, 30 to 75 wt. % ethanol and 0 to 20 wt. % water. In particular, zirconium(IV) acetylacetonate, hexamethyldisiloxane tin 2-ethylhexanoate, platinum acetylacetonate, lanthanum(II) acetylacetonate and cesium acetate are dissolved in a mixture of acetic acid, ethanol and water.

Preferred apolar solvents are toluene, xylene, n-heptane, n-pentane, octane, isooctane, cyclohexane, methyl, ethyl or butyl acetate or mixtures thereof. Hydrocarbons or mixtures of hydrocarbons with 5 to 15 carbon atoms are also suitable. Xylene is especially preferable.

In particular, Zr(IV) propylate, hexamethyldisiloxane tin 2-ethylhexanoate, platinum acetylacetonate and lanthanum (III) acetylacetonate are dissolved in xylene.

The present invention also relates to the supports and catalyst particles obtainable by the method according to the invention. These preferably have a specific surface of 20 to 70 $m^2/g$.

In a preferred embodiment the catalyst particles have the following percentage composition: 30 to 99.5 wt. % $ZrO_2$ and, 0.5 to 25 wt. % $SiO_2$ as support, 0.1 to 1 wt. % Pt, 0.1 to 10 wt. % Sn, La and/or Cs, relative to the mass of the support, wherein at least Sn and La or Cs are contained.

The present invention also relates to the use of the catalyst particles as hydrogenation catalysts or dehydrogenation catalysts. Alkanes, such as butane and propane, but also ethylbenzene, are preferably dehydrogenated.

The use of the catalysts according to the invention for the dehydrogenation of propane to propene is especially preferred.

The invention is explained in more detail with the following examples.

EXAMPLES

Chemicals Used

Zirconium acetylacetonate Zr(acac)$_2$ (98%)
Zirconium(IV) propoxide Zr(OPr)$_4$ (70% in 1-propanol)
Hexamethyldisiloxane (HMDSO) (98%)
Tin(II) 2-ethylhexanoate (approx. 95%)
Platinum(II) acetylacetate (98%)
Lanthanum(III) 2-ethylhexanoate (10% w/v)
Lanthanum(III) acetylacetonate (99.99%)
Cesium acetate (99.99%)
Mixture of acetic acid (100%), ethanol (96%) and water (deionized)
Xylene (BASF, mixture of isomers)

Preparation of the Solutions of the Precursor Compounds

The solvent is HoAc:EtOH:H$_2$O in the proportions by weight 4.6 to 4.6 to 1. The acetic acid-ethanol mixture is freshly prepared. The precursor compounds for Sn, Cs, La, Si, Pt and Zr are dissolved therein.

The composition of the polar solutions of the precursor compounds for the examples 1, 2, 3, 9 and 10 is shown in Table 1.

TABLE 1

Compositions of the solutions of the precursor compounds for polar mixtures (EtOH:HoAc:H$_2$O)

| [g] | Substance | Purity [wt. %] |
|---|---|---|
| 99.52 | Zirconium(IV) acetylacetonate | 98 |
| 1.77 | Hexamethyldisiloxane | 99 |
| 0.93 | Tin 2-ethylhexanoate | 95 |

TABLE 1-continued

Compositions of the solutions of the precursor compounds for polar mixtures (EtOH:HoAc:H$_2$O)

| [g] | Substance | Purity [wt. %] |
|---|---|---|
| 0.27 | Platinum acetylacetonate | 98 |
| 2.45 | Lanthanum(III) acetylacetonate | 99.9 |
| 0.38 | Cesium acetate | 99.99 |

For preparing the solution of the precursor compound for example 4, the following substances were dissolved in xylene. The composition is shown in Table 2.

TABLE 2

Compositions of the solutions of the precursor compounds for apolar mixtures (xylene)

| [g] | Substance | Purity [wt. %] |
|---|---|---|
| 374.40 | Zr(IV) propylate in n-propanol | 70 |
| 10.11 | Hexamethyldisiloxane | 99 |
| 5.32 | Tin 2-ethylhexanoate | 95 |
| 1.52 | Platinum acetylacetonate | 98 |
| 103.47 | Lanthanum(III) 2-ethylhexanoate | 10 |

In the case of the preparation of the solutions of the precursor compounds for examples 5, 6 and 8, an additional 2.14 g of cesium acetate are used as well.

Examples 1 to 10

Production of the Catalyst Particles by Flame-Spray Pyrolysis

The solution containing the precursor compounds was supplied by means of a piston pump via a two-component nozzle and atomized with a corresponding amount of air. To reach the corresponding temperatures, sometimes a support flame from an ethylene-air mixture was used, which was supplied via an annular burner located around the nozzle. The pressure drop was kept constant at 1.1 bar.

The flame synthesis conditions are summarized in Table 3.

TABLE 3

Test parameters relating to the production of flame-spray pyrolysis catalysts

| Example | Solvent | $c_{Zr}$ [mol/kg solution] | Flow rate of precursor compound | Total gas flow [l/h] | Dispersion gas flow [l/h] | Ethylene [l/h] | GLMR[1] |
|---|---|---|---|---|---|---|---|
| 1 | HoAc, EtOH, H$_2$O | 0.5 | 500 | 3500 | 1200 | 40 | 3 |
| 2 | HoAc, EtOH, H$_2$O | 0.5 | 510 | 3500 | 1200 | 20-40 | 3 |
| 3 | HoAc, EtOH, H$_2$O | 0.2 | 515 | 3500 | 1200 | 10-50 | 3 |
| 4* | Xylene | 1 | 280 | 3500 | 1200 | 0 | 5 |
| 5 | Xylene | 1 | 290 | 3500 | 1200 | 0 | 5 |
| 6 | Xylene | 1 | 310 | 3500 | 1200 | 0 | 4 |
| 7** | Xylene | 1 | 310 | 3500 | 1200 | 0 | 4 |
| 8 | Xylene | 1 | 255 | 3500 | 1200 | 20-40 | 5 |
| 9 | HoAc, H$_2$O | 0.2 | 520 | 3500 | 1200 | 130-120 | 3 |
| 10 | HoAc, H$_2$O | 0.25 | 385 | 4140 | 1740 | 190-230 | 5 |

*Solution without cesium precursor compound
**Only Si and Zr precursors present
[1]GLMR = Gas to Liquid Mass Ratio.

A baghouse filter was used for separating the particles. These filters could be cleaned by applying 5 bar pressure surges of nitrogen to the filter bags.

Particle characterization was carried out by means of X-ray diffractometry (XRD) and BET measurement, and an element analysis was carried out as well. The crystallite size of the catalyst particles formed using the solution of the precursor compounds 3 and 4 is set out in Table 4.

TABLE 4

X-ray powder diffractometry for the characterization of the $ZrO_2$

| Precursor compound used | Tetragonal $ZrO_2$ [%] | Monoclinic $ZrO_2$ [%] | Crystallite size, tetragonal [nm] | Crystallite size monoclinic [nm] | Average crystallite size [nm] |
|---|---|---|---|---|---|
| 3 | 82 | 18 | 19 | 13 | 18 |
| 4 | 90 | 10 | 28 | 9 | 26 |

The syntheses of the catalysts from the above solutions comprising precursor compounds with the settings specified above produced particles having a specific surface area of 36-70 $m^2/g$ (see Table 5).

In a further experiment, the BET surface area was investigated as a function of the temperature of the combustion chamber. This involved a comparison of the solutions comprising the precursor compounds, in terms of their solvent (acetic acid versus xylene). In the case of the acetic acid mixtures, there was no clear trend apparent.

The xylene mixtures exhibited an increasing BET surface area with increasing temperature, and this may be attributed to a shorter residence time, thereby restricting particle growth.

Examples 11 to 17

Catalytic Measurements

Propane dehydrogenation was carried out at approx. 600° C. (Flows at 20 ml cat. volume, mass see Table 5): 21 Nl/h total gas (20 Nl/h propane, 1 Nl/h nitrogen as internal standard), 5 g/h water. Regeneration is carried out at 400° C. as follows: 2 hours 21 Nl/h $N_2$+4 Nl/h air; 2 hours 25 Nl/h air; 1 hour 25 Nl/h hydrogen.

The support of the reference catalyst from hydrothermal synthesis ($ZrO_2$) with subsequent spray drying is composed of 95% $ZrO_2$ and 5% $SiO_2$. The active/promoter metals are 0.5% Pt, 1% Sn, 3% La, 0.5% Cs and 0.2% K, and were applied to the support wet-chemically by impregnation in accordance with the instructions of EP 1 074 301, example 4.

The conversion, the long-term stability and the selectivity of propene formation were investigated in the catalytic tests. The results are summarized in Table 5. The activities and selectivities relate to an optimum operating state.

TABLE 5

Catalyst results for the flame-synthesized catalyst particles in autothermal propane dehydrogenation

| Example | Mass of catalyst/g | Catalyst used from example | BET [$m^2/g$] | Activity % | Selectivity % |
|---|---|---|---|---|---|
| 11 | 15.24 | 1 | 66 | 17 | 83 |
| 12 | 16.22 | 2 | 50 | 38 | 94 |
| 13 | 16.41 | 3 | 51 | 47 | 96 |
| 14 | 22.26 | 4 | 36 | 46 | 95 |
| 15 | 16.90 | 5 | 59 | 35 | 94 |
| 16 | 17.75 | 6 | 52 | 31 | 92 |
| 17 | 16.80 | 7 | 23 | 48 | 95 |

FIG. 1 shows activities and selectivities for the flame-synthesized catalysts (▲ example 13, ■ example 17) and for the reference catalyst (–) in the autothermal dehydrogenation of propane to propene. In the case of the catalyst (■), only the support was produced by pyrolysis, and the support was subsequently subjected to wet-chemical impregnation as for the reference catalyst. The time in hours is plotted on the abscissa, and the conversions (40 to 50%) and selectivities (>80%) are plotted on the ordinate.

It can be seen that the three catalysts have comparable performance. The reference catalyst has lower initial selectivities. However, over the test cycles of a few weeks it equalizes to the catalysts according to the invention. Thus, the flame-synthesized catalyst behaves like an aged catalyst, which was produced by a conventional wet-chemical process.

The invention claimed is:

1. A method of production of catalyst particles, comprising platinum and tin and also at least one further element, selected from lanthanum and cesium, on a support comprising zirconium dioxide and optionally silicon oxide, comprising the steps
    (i) preparing one or more solutions containing precursor compounds of platinum, tin and the at least one further element, selected from lanthanum and cesium, and also of zirconium dioxide and optionally silicon dioxide,
    (ii) converting the solution(s) to an aerosol,
    (iii) bringing the aerosol into a directly or indirectly heated pyrolysis zone,
    (iv) carrying out pyrolysis with a gas, and
    (v) separating the catalyst particles formed from the pyrolysis gas.

2. The method as claimed in claim 1, wherein the precursor compounds additionally comprise a silicon dioxide precursor compound.

3. The method as claimed in claim 1, wherein the pyrolysis zone is heated by a flame.

4. The method as claimed in claim 1, wherein the catalyst particles formed contain 0.05 to 1 wt. % Pt and 0.05 to 2 wt. % Sn.

5. The method as claimed in claim 1, wherein the precursor compounds comprise zirconium(IV) acetyleacetonate.

6. The method as claimed in claim 1, wherein the precursor compounds comprise lanthanum(III) acetyleacetonate or cesium acetate or a mixture thereof.

7. The method as claimed in claim 1, wherein the precursor compounds comprise hexamethyldisiloxane.

8. The method as claimed in claim 1, wherein the precursor compounds comprise tin 2-ethylhexanoate.

9. The method as claimed in claim 1, wherein the precursor compounds comprise platinum acetylacetonate.

10. The method as claimed in claim 1, wherein the precursor compounds comprise zirconium(IV) propoxylate.

11. The method as claimed in claim 1, wherein the precursor compounds comprise lanthanum(III) 2-ethylhexanoate.

12. The method as claimed in claim 1, wherein one or more of the precursor compounds are dissolved in a mixture of acetic acid, ethanol and water.

13. The method as claimed in claim 7, wherein one or more of the precursor compounds are dissolved in xylene.

14. The method as claimed in claim 1, wherein pyrolysis is carried out at a temperature of 900 to 1500° C.

* * * * *